US006111881A

United States Patent [19]
Soncodi

[11] Patent Number: 6,111,881
[45] Date of Patent: Aug. 29, 2000

[54] SIGNALING PROTOCOL FOR REROUTING ATM CONNECTIONS IN PNNI ENVIRONMENTS

[75] Inventor: Adrian C. Soncodi, Kanata, Canada

[73] Assignee: Nortel Networks Corporation, Canada

[21] Appl. No.: 08/998,664

[22] Filed: Dec. 29, 1997

[51] Int. Cl.[7] .................................................. H04L 12/28
[52] U.S. Cl. .......................................... 370/395; 370/400
[58] Field of Search ................................... 370/395, 396, 370/397, 400, 410, 254, 351, 356, 355

[56] References Cited

U.S. PATENT DOCUMENTS

| | | | |
|---|---|---|---|
| 5,475,717 | 12/1995 | Cordonnier | 370/356 |
| 5,583,862 | 12/1996 | Callon | 370/397 |
| 5,633,866 | 5/1997 | Callon | 370/397 |
| 5,699,347 | 12/1997 | Callon | 370/397 |
| 5,761,192 | 6/1998 | Hummel | 370/254 |
| 5,781,529 | 7/1998 | Liang | 370/397 |
| 5,805,578 | 9/1998 | Stirpe | 370/408 |
| 5,805,593 | 9/1998 | Busche | 370/396 |
| 5,831,975 | 11/1998 | Chen | 370/390 |
| 5,831,982 | 11/1998 | Hummel | 370/396 |

OTHER PUBLICATIONS

ATM Forum, entitled *Baseline Document of Edge–Based Rerouting for Point–to–Point Connection* AF/97–0779 by Hitoshi Masuo et al. (Sep. 1997).
ATM Forum, entitled *QoS Preservation in PNNI Rerouting*, AF/97–0872 by David M. Kushi et al. (Sep. 1997).
ATM Forum, entitled *Message Formats and IE Encodings for Rerouting*, AF/97–0871 by David M Kushi et al. (Sep. 1997).
ATM Forum, entitled *Fault Tolerance for Point–to–Point Connections in PNNI*, AF/97–0541 by Hitoshi Masuo et al. (Jul. 1997).
ATM Forum, entitled *Fault Tolerance for Point–to–Multipoint Connections in PNNI*, AF/97–0542 by Hitoshi Masuo et al. (Jul. 1997).
ATM Forum, entitled *Procedures for Fast Connection Recovery in PNNI Networks*, AF/97–0632 b Ethan Mickey Spiegel et al. (Jul. 1997).
Article entitled *White Paper: PNNI Control Point*, IBM ATM Networking Group, Zurich Research Lab, dated Mar. 1997.

*Primary Examiner*—Ajit Patel
*Assistant Examiner*—Ricardo M. Pizarro
*Attorney, Agent, or Firm*—Finnegan, Henderson, Farabow, Garrett & Dunner, L.L.P.

[57] ABSTRACT

A method in a connection based communication network for rerouting a call connection path coupling a calling and a called party. Rerouting is done within a peer group and may be performed in any peer group level along the connection path. The method allows individual segments within peer groups to be rerouted for a number of different reasons such as fault recovery, route optimization, bandwidth adjustment, and load balancing. The reroutable call paths are implemented by inserting rerouting information elements in the standard setup and connect messages used to create call paths in PNNI environments. These information elements permit both nonpreemptive rerouting, establishing a new call path before the old one is terminated and preemptive rerouting, establishing a new path after the old one is terminated. Additional features such as, preserving QoS metrics during rerouting and separately identifying different incarnations of segments along the same call path are also provided.

21 Claims, 12 Drawing Sheets

SIGNALING PROTOCOL FOR REROUTING ATM CONNECTIONS IN PNNI ENVIRONMENTS

BACKGROUND OF THE INVENTION

The present invention relates to the field of Asynchronous Transfer Mode (ATM) networks and more particularly to a signaling method for rerouting ATM connections within the Private Network Node Interface or Private Network-to-Network Interface (PNNI) domain.

Developed through the efforts of the ATM Forum and detailed in "The ATM Forum Technical Committee, Private Network-Network Interface Specification Version 1.0 (PNNI 1.0)," af-pnni-0055.000, March 1996, PNNI 1.0 is a protocol standard that enables the building of multivendor, interoperable ATM switching networks. The protocol allows for the building and maintenance of large ATM networks because it provides hierarchical, dynamic link-state routing instructions and communication pathways. The protocol permits separate ATM switches within interconnecting networks to continuously communicate and share information. In addition, PNNI defines signaling requests for establishing and taking down point-to-point and point-to-multipoint connections across those networks.

PNNI routing is based on well-known, link-state routing techniques similar to, for example, Open Shortest Path First (OSPF). In addition to the basic link-state mechanism, PNNI provides support for quality of service (QoS) routing, required for applications with real-time requirements and scalability to large global networks. These features provide large-scale networks with a single routing protocol, unlike the Internet strategy of using a number of protocols at various levels.

In these environments, rerouting refers to changing the path of an existing connection anywhere between its two end-points. No user signaling is needed to reestablish the connection as the operation is performed by the network, allowing the calling and called parties to be continuously connected. To establish these connections, PNNI environments operate with peer groups (PG), a collection of logical nodes that exchange information with other members of the group. This information exchange allows all members of the same peer group to maintain an identical view of the PG and for those nodes outside of the PG to exchange messages with the PG as a whole.

PNNI 1.0 does not support rerouting after a connection has been established. One submission to the ATM Forum, entitled *Signaling Procedures For Fault Tolerant Connections* AF/97-0391R1 by D. M. Kushi et al. and E. M. Spiegel (April 1997), however, discussed so-called fault-tolerant connections. According to AF/97-0391, which is herein incorporated by reference, these connections are automatically reestablished (without user intervention) only in the case of a network failure. When a failure occurs, the fault-tolerant connection is rerouted end-to-end, within the PNNI domain, i.e., between the two user-to-network interfaces (UNI) connecting the calling and called party.

End-to-end and fault-based rerouting schemes are restrictive because they must essentially reestablish the entire connection and as a result, are slower than partial connection rerouting. Therefore, a need exists for a rerouting solution that overcomes the deficiencies of fault tolerant and end-to-end rerouting. The solution should provide a more generic and complete mechanism and protocol that permits connection rerouting for reasons beyond network failures. Path optimization, load balancing, fault tolerance, call priority, etc. should be among the features supported by any PNNI rerouting solution. These rerouting reasons could be considered value added features, providing users of the network with a variety of increased services and potentially better quality connection paths. Fundamental to a generic connection rerouting solution is the ability of the connections to be rerouted along a new path prior to releasing an old path's connection. Finally, the solution should interface with the existing PNNI routing protocols that do not support basic rerouting functions, namely PNNI 1.0.

SUMMARY OF THE INVENTION

The invention meets these needs, and others, by providing a generic rerouting protocol that can be performed on any level of a hierarchical based communication system, such as PNNI.

In accordance with the purposes of the invention as embodied and broadly described herein, a method for managing calls in a network having at least one peer group including a set of nodes includes the steps of establishing a call path connecting a set of nodes and detecting an event associated with the call path. The method also includes the step of determining a new call path connecting a new set of nodes in a peer group and establishing the new call path via the new set of nodes.

Systems and networks are also provided for carrying out the methods consistent with the present invention. In particular, a communications network including a plurality of peer groups with each peer group including a first border node switch configured to detect a rerouting event and transmit a rerouting message upon the occurrence of the rerouting event and a second border node switch coupled to the first border node switch via a reroutable call path and configured to return a connect message upon receiving the rerouting message. The network also includes means for connecting first border node switch to the second border node switch via a rerouted call path upon receiving the connect message at the first border node switch.

In addition, a method for establishing a reroutable call connection includes the steps of receiving a call request at a source node and forwarding a setup message to a destination node, wherein the setup message includes a rerouting information element identifying the call request as a reroutable call request. The method also includes the steps of returning, upon receiving the setup message, a connect message to the source node and connecting the source node to the destination node via the reroutable call connection path.

The advantages accruing to the present invention are numerous. For example, both preemptive rerouting (for the purposes of this invention), i.e., establishing a new call connection path after the old path has been connected and nonpreemptive rerouting, i.e., establishing a new call path after a successful rerouting procedure has occurred, are supported. In addition, this protocol allows rerouting to be performed between any two border nodes of any peer group or any peer group level, regardless of the level on which the border nodes reside. The goals are further achieved by introducing a variety of information element fields distinguishing rerouting messages from standard PNNI messages and uniquely distinguishing routing segments along a particular connection path.

The summary and the following detailed description should not restrict the scope of the claimed invention. Both provide examples and explanations to enable others to practice the invention.

BRIEF DESCRIPTION OF THE DRAWINGS

The accompanying drawings, which are incorporated in and constitute a part of this specification, illustrate methods, apparatus, and networks consistent with this invention and, together with the description, explain the principles of the invention.

In the drawings.

DETAILED DESCRIPTION

The present invention allows call connections in a communication network to be rerouted between various nodes in the network. A protocol consistent with, and built upon, PNNI standard 1.0 is provided to give instructions and commands for use in rerouting call connection signals. Rerouting may occur for a number of reasons such as path optimization, load balancing, fault tolerance. The present invention provides a set of operations and rules that can be implemented for any rerouting purpose. Further, the present invention supports both preemptive and nonpreemptive rerouting, each of which is linked to the point in the rerouting process when the new call connection is established, i.e., before or after the old connection is released, respectively.

I. PNNI Environment

A. System

Figure 1:
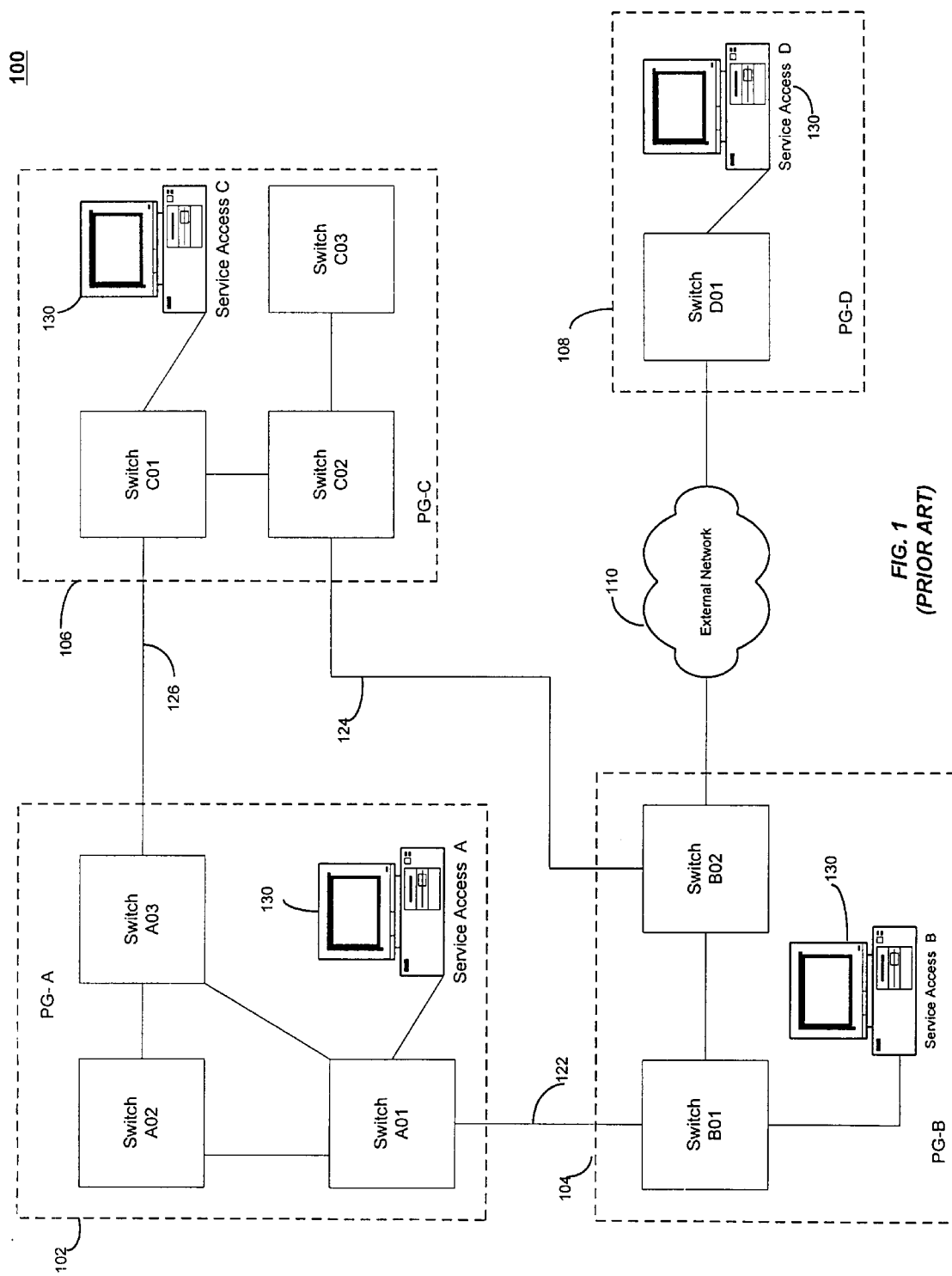
FIG. 1 is a block diagram of a communications network consistent with this invention.

FIG. 1 is a block diagram of a connection-based communications network 100 in a PNNI environment consistent with this invention. In this example, network 100 includes a number of interconnected subsystems, or "peer groups" (PG), PG-A 102, PG-B 104, and PG-C 106 coupled to an external subsystem 108 via an external network 110. In a typical PNNI environment, network 100 is implemented in a "campus" type backbone environment, where the PGs reside at various buildings within the campus and are coupled to external network 110, such as a public telephone switching network (PSTN). PG-A 102, PG-B 104, and PG-C 106 are coupled to one another by conventional signal communication lines 122, 124, and 126, allowing ATM communication packets to be freely transmitted from one PG to another.

PG-A 102, PG-B 104, PG-C 106, and PG-D 108 include a number of interconnected logical switching points or "nodes." PG-A 102, for example, is depicted with three such nodes or switches A01, A02, and A03. Switches A01 and A03 represent border nodes or the interconnection points that link PG-A 102 to the other PGs in the network. Preferably, switches A01-A03 are ATM switches that serve as translation and interface points, permitting the PGs to transmit communication data between one another. While PG-A 102 is shown to include three switches, a PG may include any number of nodes depending on the size and capabilities of the network and switching hardware. In addition, PGs may include other node points that act as routing connections within the PG, but are not directly accessible from outside the PG. Further, PGs are structured in a hierarchical format where each PG is likely to include various levels containing a number interconnected nodes. These levels are considered PGs within the parent PG, and have address and level identifiers that distinguish the level, or scope, in which they reside.

Each PG-A 102, PG-B 104, PG-C 106, and PG-D 108 also includes a service access point 130 (also referred to herein as a Network Service Access Point (NSAP)) that links the logical nodes of the PG with the actual calling or called parties seeking to transmit and receive communication signals. Service access point 130 is a communication systems server with hardware and software capable of monitoring call progress and allowing maintenance of the system or subsystem with which it is linked.

B. Call Routing

In PNNI dependent environments, call connection routing is based on the first 19 bytes of the 20 byte ATM address. The 20th byte, the selector, is used inside the end system to distinguish between different higher-layer protocols and applications. Each switching system, or node, in the network has a unique 22 byte node identifier (node ID) or address. The node ID of a switch is based on the switch's ATM address, and is automatically generated by the implementation or structure of the network (no configuration required). Individual PGs are identified by a 14 byte PG identifier (PG ID), and all nodes in the same PG must have the same PG ID. Generally, the PG ID is derived from the switch's ATM address and is therefore automatically created upon system configuration.

In order for any network to be manageable and scalable, addresses are preferably assigned so that the location, including its PG level, of a node can be determined from its address. Therefore, all nodes in a PG (and by implication the end systems attached to those nodes) are given addresses with a common prefix unique to that PG. By looking at the address prefix, an administrator or routing protocol can determine the location of a node.

C. Rerouting

Rerouting signifies changing the path of an existing connection such that the path traverses different nodes and/or links. Ideally, this procedure is done without disconnecting the end users, i.e., the end-to-end connection is not cleared and set up again. After rerouting, the same connection has a new incarnation corresponding to the new rerouted connection path. Further, rerouting can take place between different pairs of nodes along the connection path. Such a pair of nodes delimits the contiguous portion of the connection changed by rerouting. This portion is called the rerouting segment. In order for a connection to be reroutable, it needs to be so declared in an initial SETUP message. A corresponding CONNECT message then carries back information required to support rerouting. After the connection has been established, rerouting can occur several times during the life of the connection.

Figure 2:
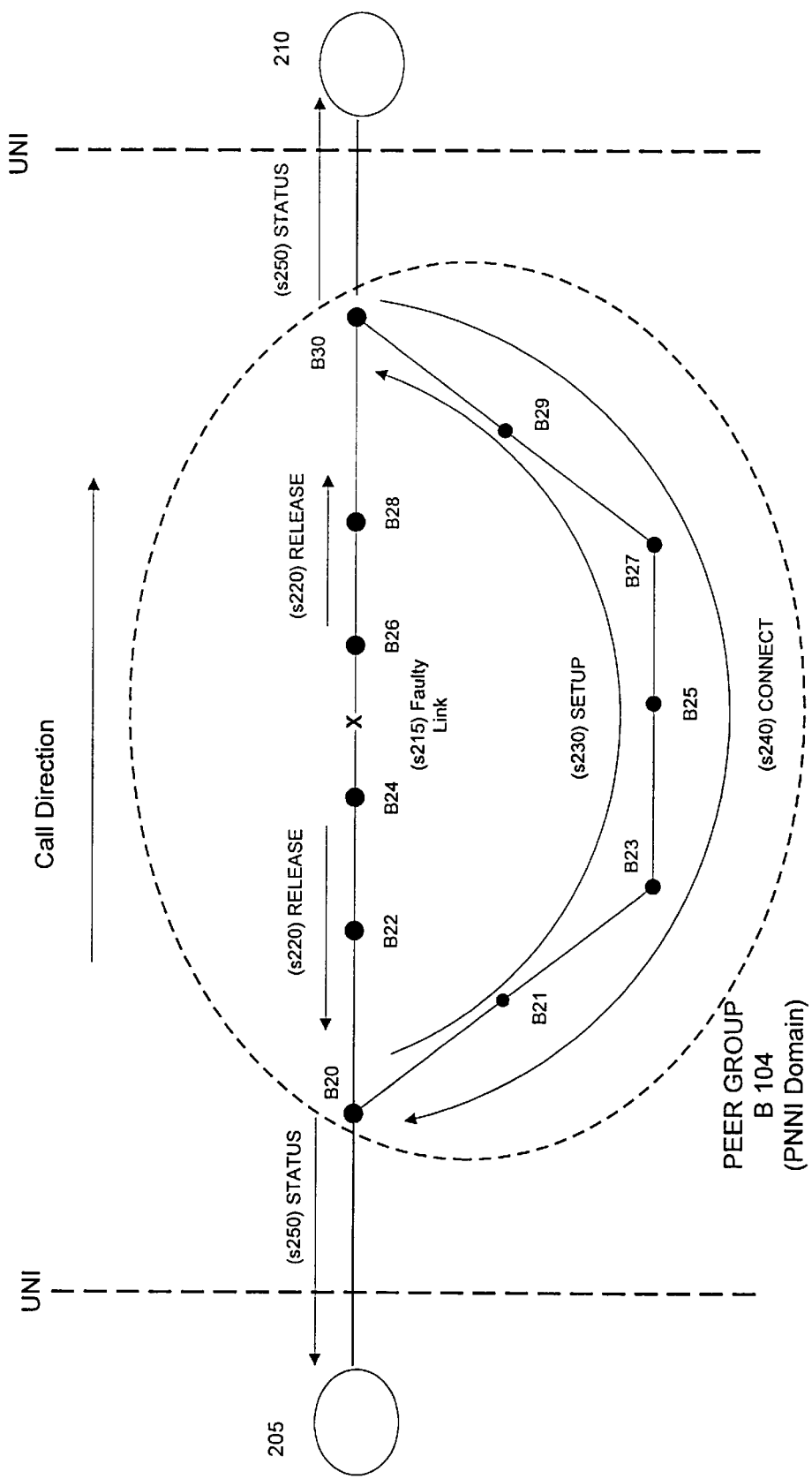
FIG. 2 is flow diagram of a preemptive end-to-end rerouting procedure consistent with this invention.

FIG. 2 depicts a procedure 200 occurring during a preemptive end-to-end rerouting, i.e., when the old route is cleared before a new route is established. This procedure happens, for example, when a link or node failure occurs and the rerouting procedure is initiated to release the old route. PG-B 104 includes a call connection path via nodes B20, B22, B24, B26, B28, and B30. The call connection path establishes a link between a calling party 205 and a called party 210. When a fault occurs at an active link between neighboring nodes B24 and B26 (Step s215), RELEASE messages are sent in both directions toward nodes B22 and B28 (Step s220).

These RELEASE messages, however, are not propagated past network entry node B20 or exit border node B30. These border nodes hold the user (i.e.,UNI) side of the connection, while only releasing the network side. Using a subsequent SETUP message (Step s230) and a CONNECT message (Step 240), the end nodes are linked along another route via nodes B21, B23, B25, B27, and B29. In this case, calling party 205 and called party 210 located across UNI interfaces are not disconnected, but are sent STATUS messages (Step s250) informing them of the events occurring on the connection link.

Figure 3:
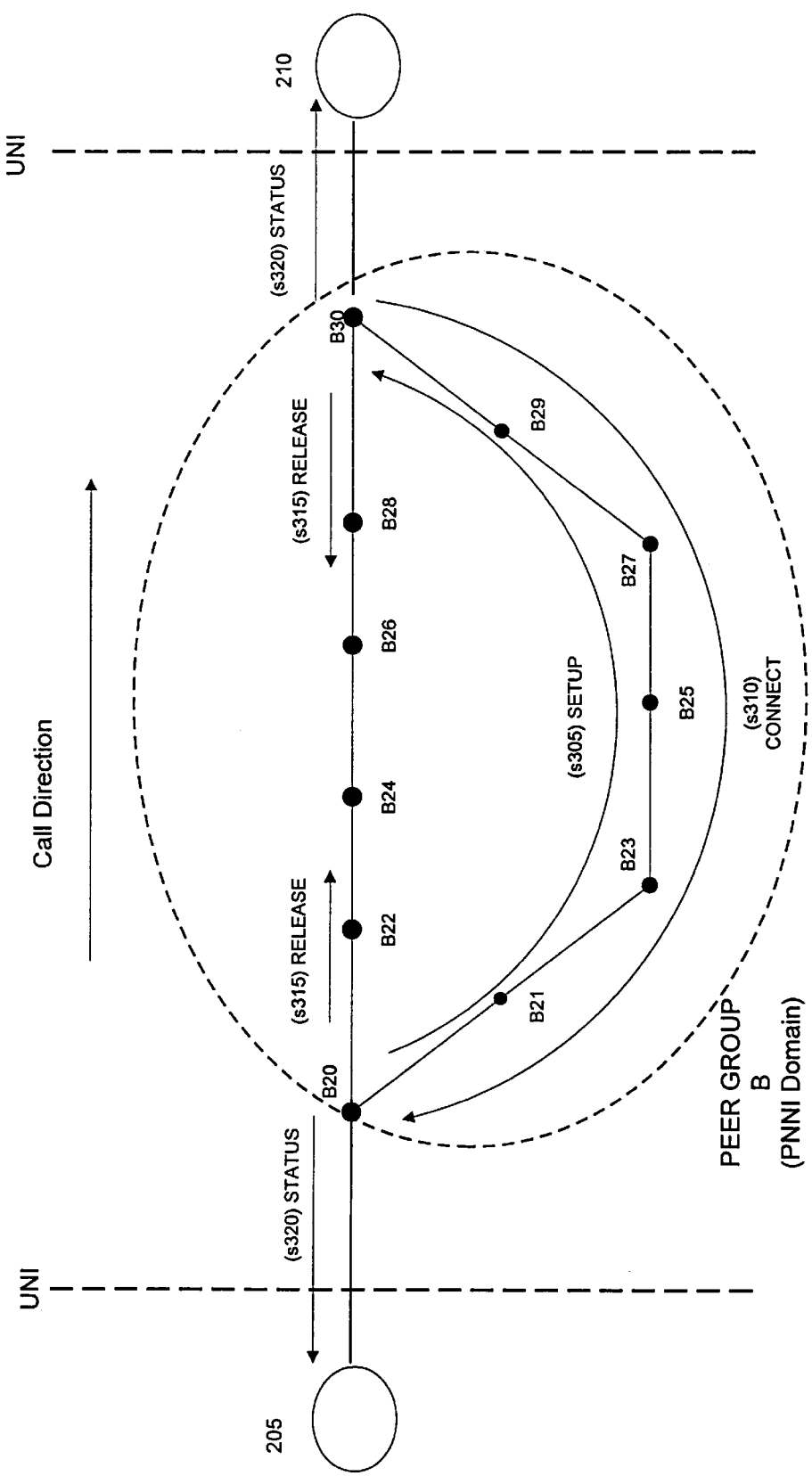
FIG. 3 is flow diagram of a nonpreemptive end-to-end rerouting procedure consistent with this invention.

FIG. 3 is flow diagram of a nonpreemptive end-to-end rerouting procedure 300, consistent with the present invention, for use, for example, when the old route is cleared after a new route is established. Preferably, nonpreemptive rerouting occurs for reasons other than connection faults, such as route optimization, QoS/bandwidth adjustment, priority based call bumping, etc. The present invention also contemplates other nonpreemptive rerouting reasons such as mobile handover, load-balancing, and the like.

In FIG. 3, an original call path connection traversing nodes B20, B22, B24, B26, B28, and B30 is established between calling party 205 and called party 210. To reroute the original path along a new rerouting path, a SETUP message intended to reincarnate the connection is generated by the border node, or "rerouting node," B20 residing upstream relatively to the direction of the call (Step s305). Next, upon receiving the SETUP message, or "reincarnation request," from rerouting node B20, an exit border node, or "rendezvous node," B30 residing downstream, relative to the direction of the call, generates and returns a CONNECT, or "reincarnate confirmation," message to rerouting node B20 (Step s310). The details of the reincarnate request and the reincarnate confirmation message are described in greater detail below.

After the new rerouted connection (via nodes B20, B21, B23, B25, B27, B29, and B30) is created, the border nodes B20 and B30 each generate a RELEASE message in the direction of the neighboring, or segment node, i.e., B22 and B28, respectively (Step s315). Finally, a STATUS message, similar to that described in conjunction with FIG. 2, is forwarded from nodes B20 and B30 to calling party 205 and called party 210, respectively (Step s320).

Figure 4:
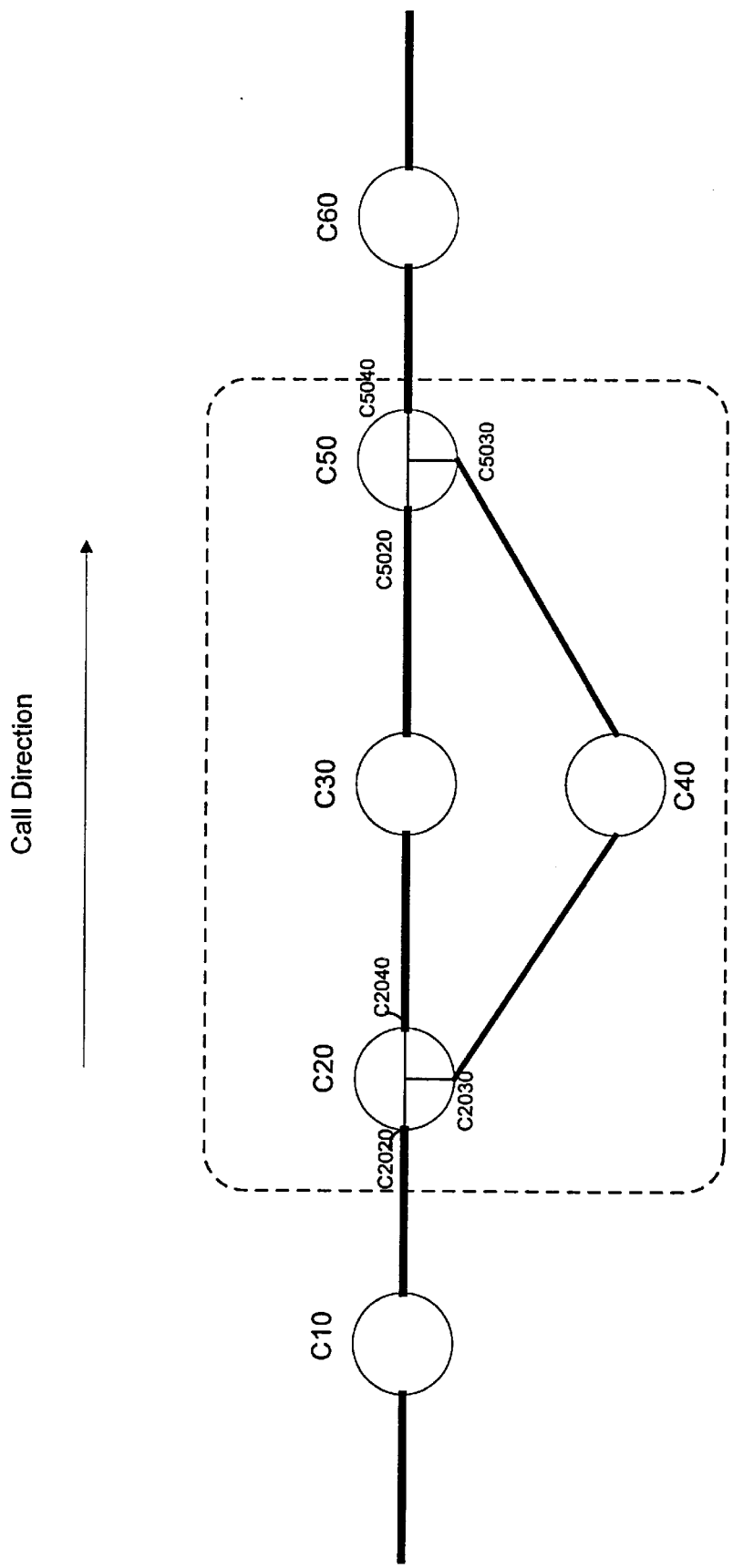
FIG. 4 is a diagram showing a rerouted connection within a peer group traversed by a call connection path consistent with this invention.

In order to properly reroute a call connection, the rerouting and rendezvous nodes must execute a local release function that switches the local connection points of the call path within the individuals nodes. FIG. 4 is a diagram showing a rerouted connection within an intermediate PG-C 106 traversed by a call connection path. Assuming the connection has been established along the route (nodes C10, C20, C30, C40, C50), nodes C20 and C50 are the entry and exit border nodes, respectively, (relatively to the direction of the call, as shown by arrow) for intermediate PG-C 106. C20 and C50 delimit the rerouting segment (C20, C30, C50). If the connection is to be rerouted within PG-C 106, the new route, or "reincarnation segment," will traverse segment (C20, C40, C50), and segments (C10–C20) and (C50–C60) are not changed.

Preferably, in nonpreemptive rerouting, the rerouting segment (C20, C30, C50) may or may not be released in the end. If reincarnation is successful, the reincarnation segment (C20, C40, C50) becomes the new rerouting segment (for future rerouting procedures) corresponding to the segment path through PG-C 106. Otherwise, the connection along the existing segment is preserved, and this segment remains the rerouting segment corresponding to PG-C 106.

If the connection has been successfully established along the reincarnation segment (C20, C40, C50), then rerouting node C20 performs a local reconnection procedure. This procedure includes deleting the local connection between interfaces C2020 and C2040 and reestablishing it between interfaces C2020 and C2030. Similarly, rendezvous node C50 performs the reconnection procedure by deleting the local connection between the interfaces C5020 and C5040 and reestablishing it between the interfaces C5030 and C5040. Note that interface C5020 is the reconnection interface at rendezvous node, and its address is preferably known by reincarnate node C20 prior to rerouting the connection.

III. Segment Based Rerouting

The mechanism or procedure that allows rerouting of a connection between the entry and exit border node of any traversed or intermediate PG is referred to as segment-based rerouting. The PG on which rerouting is performed at a given time is also referred to as the scope of that particular rerouting procedure. The scope is particularly relevant when the PG contains multiple levels. If, for example, a connection path must be rerouted for a fault or path optimization within a multilevel PG, the rerouting procedure can be executed at the lowest level PG where the failed link can be avoided. If no alternate route is found in this PG, then the rerouting scope can be extended to a higher level PG within the hierarchy. This type of segmentbased, or PG level, rerouting is faster then the end-to-end rerouting strategy described above, because the entire call path connection does not have to be rerouted and reestablished.

Figure 5A:
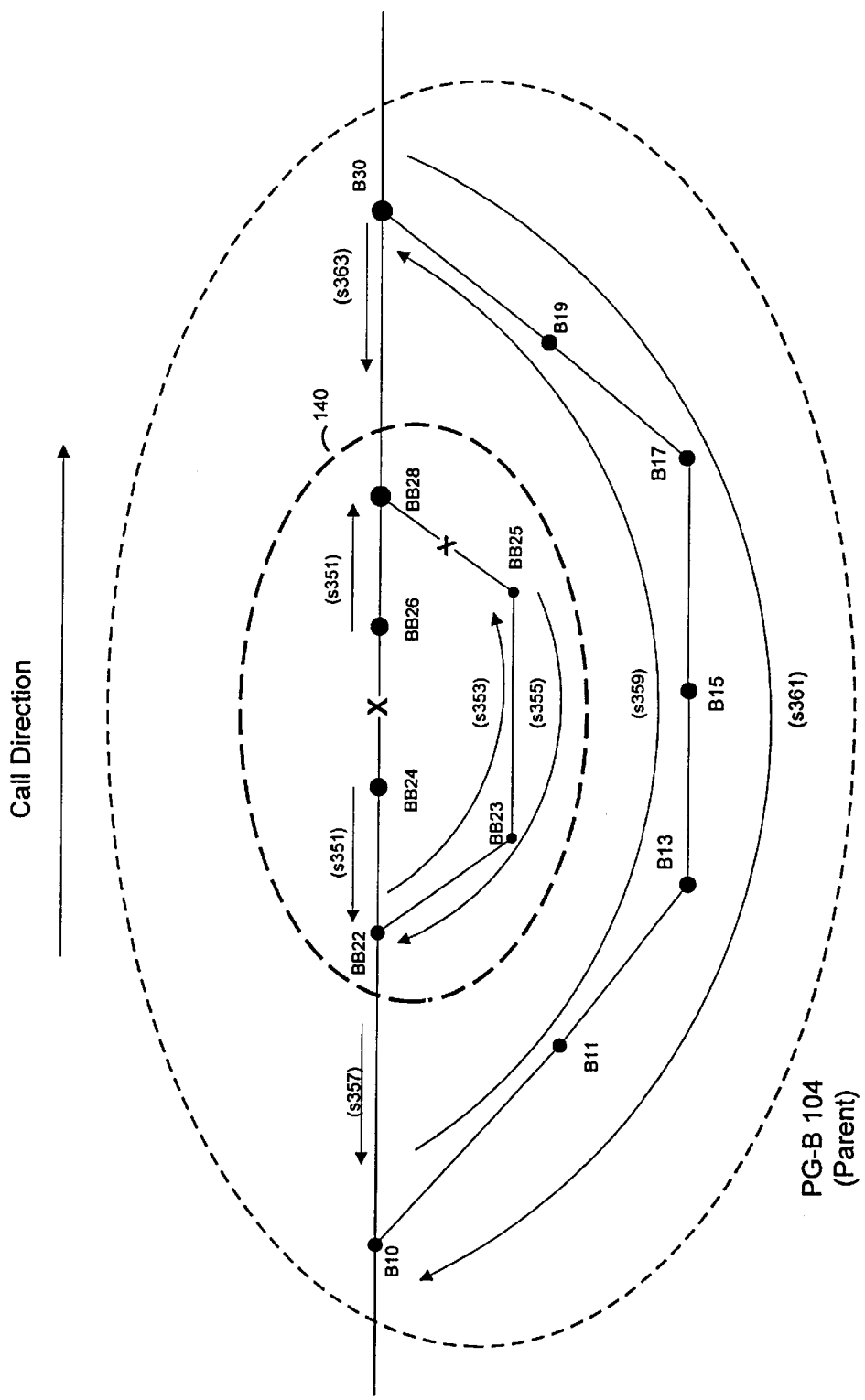
FIG. 5A is a flow diagram showing a segment based rerouting procedure consistent with this invention.

FIG. 5A is a flow diagram detailing the steps for a segment based rerouting procedure 350 consistent with the present invention. In this example, the original call connection path traverses intermediate PG-B 104, which includes a sublevel, or child, PG-BB 140. The original call connection path traverses reroute node B10 and rendezvous node B30 via nodes BB22, BB24, BB26, and BB28. If a connection fault occurs between nodes BB24 and BB26, a segment based rerouting procedure is attempted within the lower level PG-BB 140. First, RELEASE messages are sent along the incumbent segment connections from BB24 to BB22 and BB26 to BB28 (Step s351). Next, a reincarnate message is attempted to establish a rerouted segment path between BB22 and BB28 via BB23 and BB25 (Step s353).

Assuming the presence of a faulty link between nodes BB25 and BB28, indicated by X, the reincarnate message does not reach BB28 through this path. BB25, failing to receive a reincarnation confirmation message from BB28, transmits a RELEASE message to BB22 via BB23, terminating the recently established segment connection BB22-BB25 (Step s355). BB22 forwards the release message to the next PG hierarchy level via border node B10 (Step s357). B10 generates a reincarnate message and forwards it to rendezvous node B30 via nodes B11, B13, B15, B17, and B19 (Step s359). Upon receiving the reincarnate message, B30 returns a reincarnate confirmation message to reroute node B10, thereby establishing the rerouted connection path via B11, B13, B15, B17, and B19 (Step s361). Finally, the segment path between B30 and BB28 is terminated with a release message from B30 (Step s363). As shown in FIG.

5A, the newly rerouted connection path completely bypasses lower level PG-BB 140.

IV. Message Content

In PNNI environments, and as described in ATM forum specification UNI 4.0, which is herein incorporated by reference, messages and commands include information elements (IE) that provide a stack of data information fields defining the node or call connection path. In the present preferred embodiment, additional information elements are added in the various messages and commands transmitted within the environment. These additional IEs distinguish reroutable messages from normal call connection commands. Preferably, the SETUP, CONNECTION, and RELEASE messages, normally associated with call path connection establishment, are altered to include IEs indicating the rerouting capabilities of the nodes traversed by the path.

A. SETUP Message

A REROUTING CAPABILITIES IE is inserted in a standard SETUP message to define the set of rerouting capabilities for a connection. Preferably, this parameter provides the activation of the rerouting for this connection, such as a rerouting type and a rerouting reasons (i.e., causes) for the connection. The rerouting type field, for example, defines the rerouting types supported by a particular node, link, or segment. In the present preferred embodiment, this field will indicate whether segment-based rerouting is supported. The rerouting reason field defines the particular reason or value-added service implemented for the current rerouting procedure. The rerouting reasons include, but are not limited to, fault recovery, route optimization, QoS bandwidth adjustment and restoration, call-priority based bumping/rerouting and administrative, i.e., network operator initiated. By default, the absence of a REROUTING CAPABILITIES IE or like parameter indicates the connection path is not reroutable.

B. CONNECT Message

Preferably, the CONNECT message returned from the node of a reroutable connection will also contain the REROUTING CAPABILITIES IE. Essential to rerouting is the inclusion of node addresses indicating the PG and PG level in which rerouting can occur. Thus, the CONNECT message includes a stack of node addresses identifying the nodes along the call path that support rerouting.

Preferably, the CONNECT message includes an additional QoS IE that allows for preservation of QoS metrics during the rerouting procedure. As recognized by those skilled in the art, these metrics are parameters unique to a call path. In order to preserve the QoS for a connection, PG border nodes need to observe the accumulated values passed along in the SETUP and CONNECT messages. For example, delay times occurring in the transmission of signals between nodes are saved and, upon rerouting, compared to the values corresponding to the old and the new route. Since the two routes only differ on a segment, the difference incurred by the new route can be computed. Thus, the rerouting node is able to determine whether the new route still satisfies the QoS requirements of the original call.

C. Reincarnate Request

Once the call connection path has been established and defined as a reroutable connection, the connection path and nodes traversed will generate and receive messages configured for rerouting. The rerouting SETUP, or reincarnate request, message, for example, includes a REINCARNATE IE specifically distinguishing it from the standard SETUP message.

Preferably, the REINCARNATE IE includes 1) a current rerouting type, a number identifying the requested rerouting type, and 2) a current rerouting reason, a number identifying the rerouting reason for the current reincarnate request. Both of these representative numbers are determined from the REROUTING CAPABILITIES IE. The REINCARNATE IE also includes a current rerouting level, which specifies the PG hierarchy level (scope) in which rerouting is requested by the current SETUP message. Further, the REINCARNATE IE includes a current segment number (SN) information field, containing an identifier corresponding to the rerouting segment delimited by the PG at the current rerouting level. In the present preferred embodiment, the SN information field includes a numerical identifier, but alternatively could include other information or be designated by some other variable.

Preferably, the SN information, together with a Network Call Correlation Identifier (NCCI), uniquely identifies an incarnation of a connection on a given segment within a PG. Within the PNNI domain, the NCCI is unique for each connection path, but it is the same for all subsequent incarnations of a given connection path, and therefore cannot distinguish between particular call path connection incarnations. In the present preferred embodiment, the addition of SN information distinguishes between incarnations of the same path, i.e., if two incarnations coexist for a short time on the same node. It should be noted that no SNs are present in the initial SETUP message, because all levels are implicitly zero.

D. Rerouting Confirmation Message

After the rendezvous node receives an initial SETUP message containing the REROUTING CAPABILITIES IE, and the subsequent rerouting request described above, information is carried back to the rerouting node in the form of a CONNECT message. Preferably, the CONNECT message, or rerouting confirmation message, includes a Rendezvous INTERFACE (RNI) IE, distinguishing it from a standard CONNECT message.

For segment-based, or PG based, rerouting, the rerouting confirmation message contains a stack of RNI IEs, one per reroutable segment, i.e., one for each PG configured for rerouting at each level of the hierarchy. If the RNI IE, or like parameter, is absent from the message then the connection is not reroutable on the corresponding segment with segment-based rerouting. This absence may occur, for example, when an exit border node of a lower level PG (which should be the rendezvous node in the PG) is a PNNI 1.0 node, or a node that does not support rerouting. If additional pairs of entry/exit border nodes that support rerouting are traversed by the call path connection, then rerouting is still possible on these corresponding segments. Intermediate nodes unable to support rerouting are allowed to exist along any route, as the present preferred embodiment can dynamically determine the segments on which rerouting is permnitted.

The RNI IE includes the rerouting level, which specifies the PG level to which the information in this IE corresponds. In addition, the RNI IE includes the current SN, distinguishing between successive connection incarnations. The content of the SN information field is also used to prevent signal races between rerouting messages when simultaneous rerouting attempts occur. The rerouting level and the SN information are determined from the reincarnate message received from the rerouting node. A rendezvous node interface address, indicating the exit border node where future SETUP/reincarnate messages is sent to permit reconnection with the previous call connection path, is also included in the RNI IE.

Preferably, the reincarnate request message also includes a field that allows preservation of QoS metrics. As stated above, the PG border nodes along the call path store cumulative QoS metrics, passed in the initial SETUP and CONNECT messages. If some additive or cumulative metric is not completely used during the call connection the remainder of this metric is later distributed to various PGs along the rerouted path. The reincarnate request message returns this information field, containing a value to be distributed among the traversed PGs. This value is subsequently divided and distributed recursively to lower level PGs within the hierarchy of the parent PG. This feature allows rerouting to occur along a new path even if a better (i.e., through another PG in terms of QoS) path exists, thereby guaranteeing an acceptable route within the original QoS requirements.

Figure 5B:
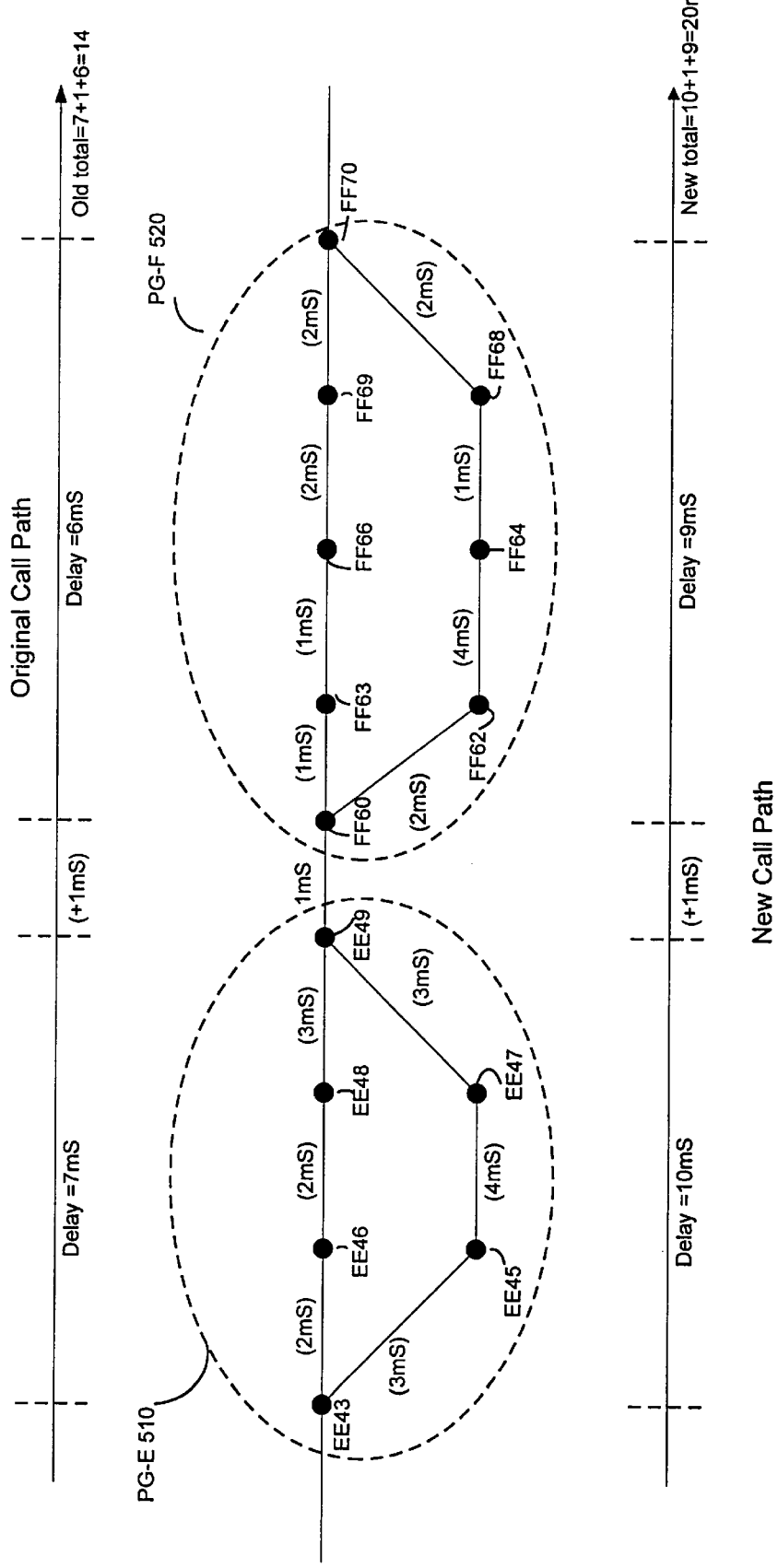
FIG. 5B is a diagram showing distributing a QoS metric consistent with the present invention.

FIG. 5B depicts an example of distributing QoS metrics to a number of PGs traversed by an original call path. To illustrate, an original call path is allocated a QoS time delay metric of 20 mS. If PG-E 510 uses 7 mS through its original PG segment path (EE43, EE46, EE48, and EE49), PG-F 520 uses 6 mS through its original PG segment path (FF60, FF63, FF66, FF69, and FF70), and 1 mS is used between border node EE49 and FF60, the preservation field would contain a metric value of 6 mS (i.e.,20 mS–14 mS).

Preferably, the metric value remaining is used by any traversed PGs in the reconnection path to preserve, at least, the original QoS requirement of 20 mS. The rerouted call path, therefore, is not restricted by the metrics actually used by the original call path, but can use any path that preserves the QoS originally requested. Preferably, the preservation field is returned in the reincarnate confirmation message to inform each PG of the additional time delay metric it can impose on the new path without compromising the original call path's QoS time delay requirements. The reincarnate confirmation message distributes the remaining metrics to the various PGs along the rerouted connection path.

In FIG. 5B, the 6 mS in the QoS preservation field of the reincarnate confirmation message is distributed equally between PG-E 510 and PG-F 520. Therefore, a rerouted segment through PG-F 520 (FF70, FF68, FF64, FF62, and FF60) can use a total of 9 mS (i.e., 6 mS+3 mS), and a rerouted segment through PG-E 510 (EE49, EE47, EE45, and EE43) is permitted to use up to 10 mS (i.e., 7 mS+3 mS). The time delay for the rerouted segments (19 mS) plus the time delay between border nodes (EE49 and FF60, 1 mS), still allows the original QoS metric of 20 mS to be met. As this example illustrates, if a PG segment is an optimal rerouting path, but for its time delay metric (i.e., the new segment added more time delay than the original PG segment), the path can reroute through the new PG segment, while still adhering to the originally allocated QoS metric of 20 mS. The reincarnate confirmation message is not limited to one such preservation field, but may include any number of fields depending on the QoS metrics monitored and ultimately allocated among the traversed PGs.

E. RELEASE Message

Preferably, the inclusion of a REROUTE IE distinguishes the RELEASE message intended to reroute a connection from a normal RELEASE message (connection clearing). The REROUTE IE includes those items present in the REROUTING CAPABILITIES IE, namely, the rerouting type, current rerouting level, and current rerouting reason.

Also included in the REROUTE IE are a failure level field, a failure transit type field, and a failure transit identifier field. These field values are only significant when the connection is rerouted due to a network failure, i.e., when the current rerouting reason is a preemptive reason that indicates fault recovery.

The failure level field indicates the PG level at which the failure occurred, however, this is not always the same as the current rerouting level. If, for example, a failure occurred at an exit border node of a PG, then the failure level is the level of this exit border node. Since the node is also a potential rendezvous node, however, reconnection at this node is not possible and the current rerouting level in this case must be at a higher level PG. The failure transit type field specifies whether the failure point is a node or a link and is consistent with the "blocked transit identifier" defined in a conventional CRANKBACK IE.

Regular RELEASE messages, such as those generated by PNNI 1.0 nodes, will not contain a REROUTE IE. The present invention, however, determines from a standard CALL TERMINATION CAUSE VALUE field, within the regular RELEASE message, whether the termination occurred due to a fault in the call path, or some other reason. If the CALL TERMINATION CAUSE VALUE field includes a network failure reason, for example, the present invention will interpret the call connection as a fault tolerant connection. Once the connection path is identified as fault tolerant, rerouting can occur on the connection regardless of whether the RELEASE message includes the REROUTE IE. This feature ensures backward compatibility with PNNI 1.0 nodes.

F. Miscellaneous

Preferably, the conventional CALLED PARTY NUMBER IE is unchanged in the initial SETUP message, and still contains the destination address of the enduser. In subsequent SETUP/reincarnate messages, this IE contains the rendezvous node interface address from the RNI IE.

IV. Establishing a Reroutable Call Path

Figure 6A:
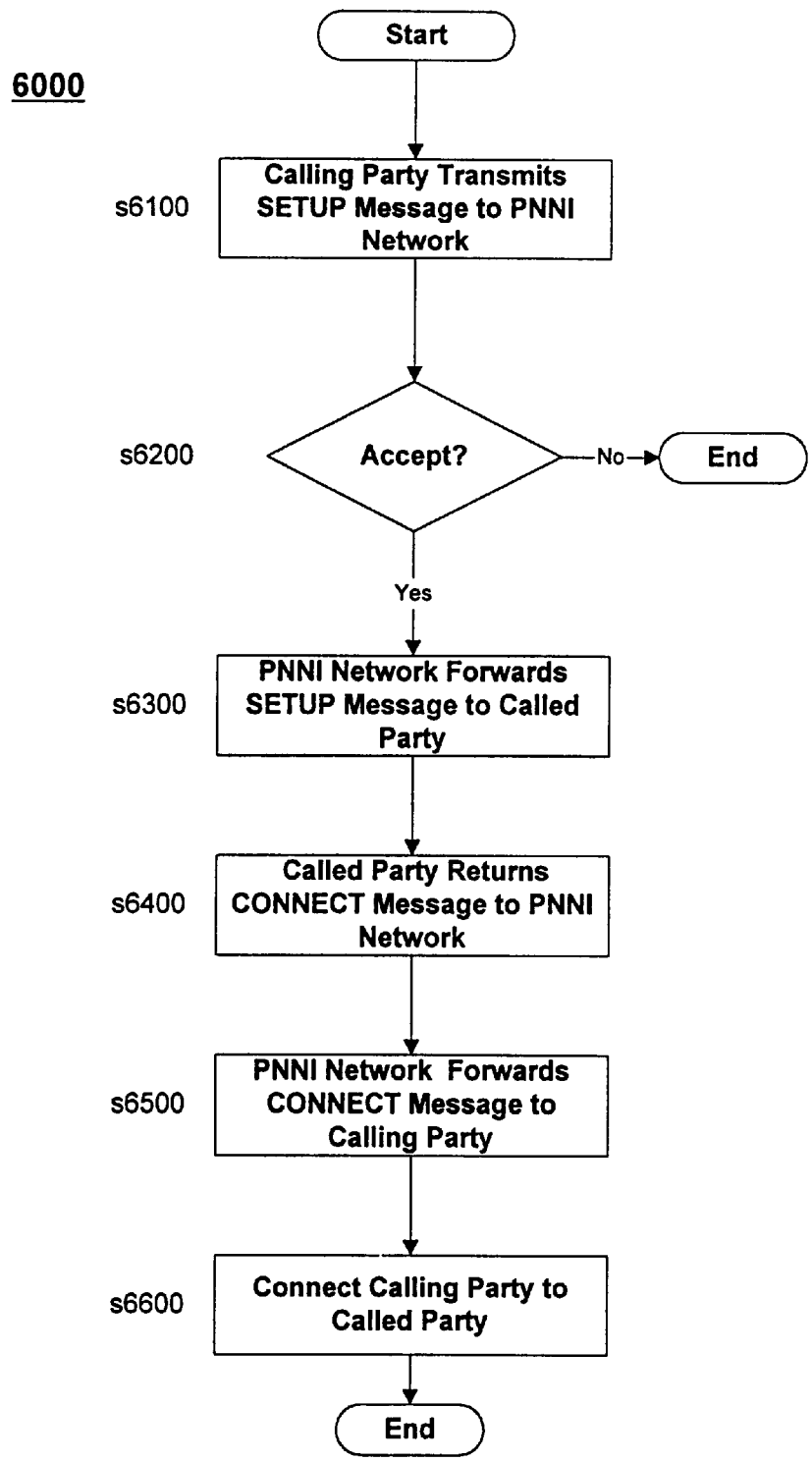
FIG. 6A is a flowchart of a method for establishing a reroutable connection path consistent with this invention.

FIG. 6A is a flowchart of a method 6000 for establishing a reroutable connection path consistent with the present invention. First, a calling party (such as a calling party 205) initiates call establishment for a connection and requests a reroutable connection by transmitting a SETUP message containing the REROUTE CAPABILITIES IE to the PNNI network (Step s6100). In this IE, calling party 205 specifies the rerouting type as being segment-based rerouting. In addition, one or more rerouting reasons are also specified. The REROUTING CAPABILITIES IE also includes an IE indicator either to "discard and proceed," if the call should be accepted even without the rerouting capability, or to "clear call," if the call should be rejected rather than accepted without the rerouting capability (Step s6200).

Upon receiving the SETUP message, a border node of network 100 forwards the SETUP message containing the REROUTING CAPABILITIES IE to the called party (Step s6300). If the call is accepted, the called party returns a CONNECT message to the network border node (Step s6400). If the border node acknowledges the connection as reroutable, the CONNECT message includes the REROUTING CAPABILITIES IE. Next, the border node forwards the CONNECT message to calling party (Step s6500), thereby establishing the call connection path (Step s6600).

If rerouting capability is supported by network 100, the CONNECT message contains the REROUTING CAPABILITIES IE indicating the rerouting types and reasons that have been accepted by the network. If the CONNECT message received by the calling party does not contain a REROUTING CAPABILITIES IE, this indicates that the rerouting capability is not provided by the network for this call.

A. SETUP

Figure 6B:
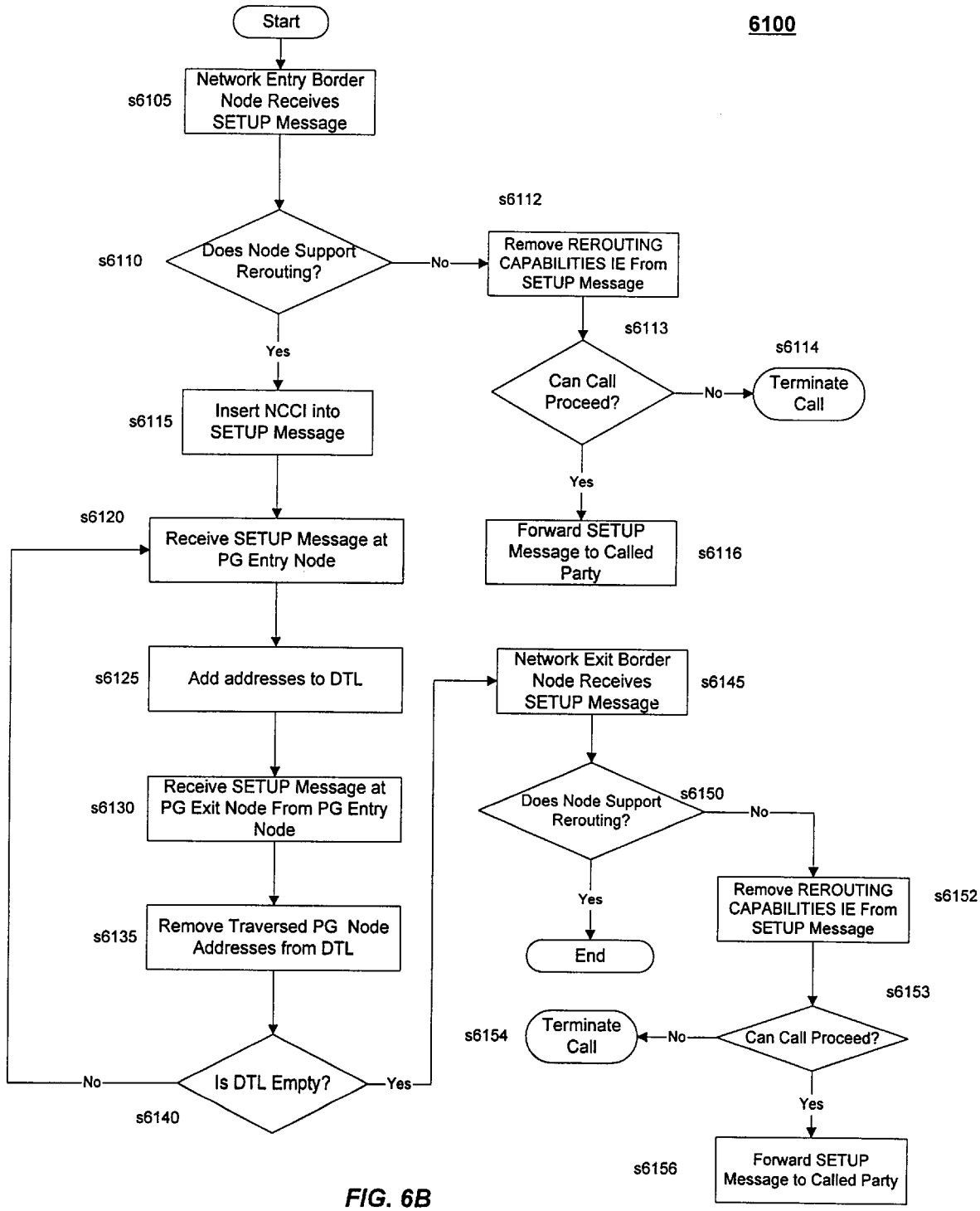
FIG. 6B is flowchart of the steps required to forward a SETUP message via a PNNI network for use with the method shown in FIG. 6A.

FIG. 6B is flowchart detailing the steps required to forward the SETUP message to the called party via the PNNI network 100 of step 6100 in FIG. 6A. If the calling party transmitting the SETUP message resides in a non-PNNI switching system, the interface at the edge of the switching system is a network entry border node for the call path connection attempt. Upon receiving the SETUP message containing the REROUTING CAPABILITIES IE (Step s6105), the network entry border node determines if it can support the requested rerouting type (i.e., segment-based rerouting) (Step s6110). If it cannot support rerouting, the REROUTING CAPABILITIES IE is removed from the SETUP message (step s6112) and the SETUP message is processed according to the IE action indicator (step s6113) of this IE. If this IE does not allow the call to proceed without being reroutable, then the connection attempt is terminated (step s6114). Otherwise, the message is forwarded toward called party 210 absent the REROUTING CAPABILITIES IE (step s6116).

If the network entry border node can support the requested rerouting type (i.e., segment- based, or PG-based, rerouting), it then inserts the NCCI associated with the call connection path in the SETUP message (Step s6120). The node may also update the REROUTING CAPABILITIES IE to reflect the rerouting capabilities that the network entry border node supports.

Upon receiving the SETUP message containing the REROUTING CAPABILITIES IE, a PNNI PG entry border node (a potential rerouting node for the connection) marks the connection as reroutable and initializes its rerouting-related data structures. Particularly, the PG entry node remembers the levels and the node addresses within its PG hierarchy, it added to a designated transit list (DTL) during the routing process for the original call connection (Step s6125). Using conventional techniques, the ATM switch associated with the call signal computes the DTL, a stack of node addresses traversed by a call connection path, to provide routing for the call signal. After adjusting the DTL, the node forwards the SETUP message toward the called party. PG nodes not supportive of rerouting ignore the REROUTING CAPABILITIES IE and simply pass along the SETUP message toward called party 205.

A PG exit border node that supports rerouting is a potential rendezvous node for the connection in the corresponding PG. Therefore, on receiving a SETUP request from the PG entry border node via a number of traversed internal PG nodes, the PG exit border node marks the connection as being reroutable, and initializes its rerouting-related data structures (Step s6130). Preferably, the node remembers the levels and the node addresses, within its PG hierarchy it removed from the DTL stack during the routing process for the call. The removal process logs the address of internal PG nodes traversed by call connection path between the entry border node and the exit border node of the traverse PG (Step s6135). Again, nodes that do not support rerouting ignore the REROUTING CAPABILITIES IE and simply pass along the SETUP message.

Next, the PG exit border node determines whether the DTL stack is empty (Step s6140). In particular, the PG exit border node determines whether the next node to receive the SETUP message is a network exit border node for the call path connection. If the DTL stack is empty, the control flow returns to Step s6120. If the DTL is not empty, there is more than one PG traversed by the call connection path. In the present preferred embodiment, any number of intermediate PGs can reside between the network entry border and the network exit border. As such, the call connection path and subsequent messages transmitted will traverse these intermediate PGs.

Upon receiving the SETUP message containing the REROUTING CAPABILITIES IE (Step s6145), the network exit border node determines if it can support the requested rerouting type (i.e., segment-based rerouting) (Step s6150). If it cannot support rerouting, then the REROUTING CAPABILITIES IE is removed from the SETUP message (step s6152) and the SETUP message is processed according to the IE action indicator of this IE (step s6153). If this IE does not allow the call to proceed without being reroutable, then the connection attempt is terminated (step s6154). Otherwise, the SETUP message is forwarded toward called party 210, without the REROUTING CAPABILITIES IE (step s6156). If this node does support the rerouting capability, then it may update the REROUTING CAPABILITIES IE to reflect the rerouting types and reasons it actually supports and proceeds to step 6200.

B. CONNECT Messaging

Figure 6C:
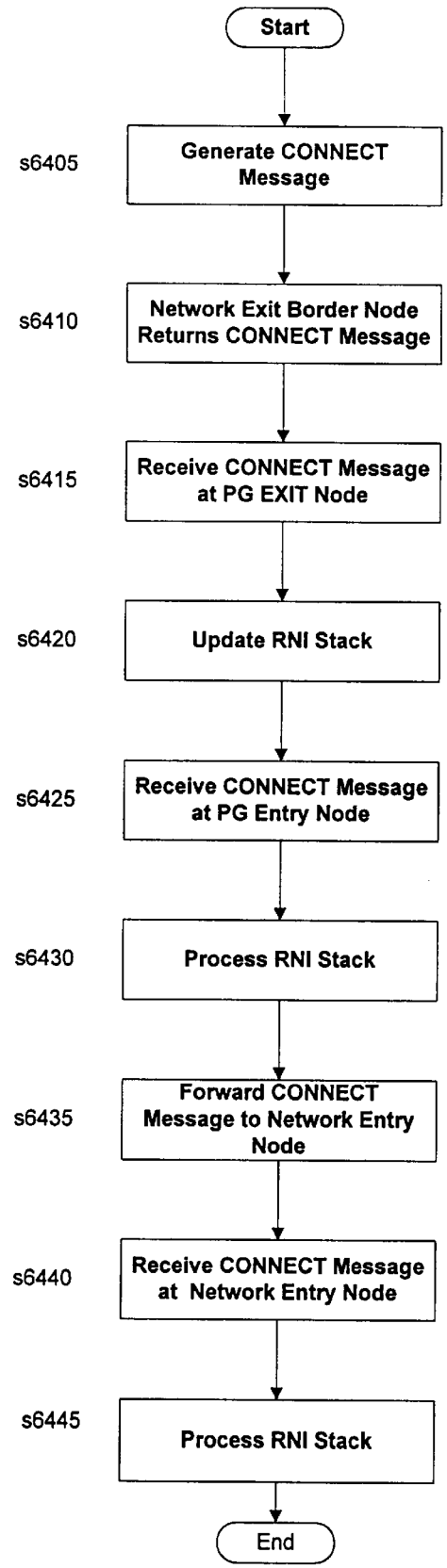
FIG. 6C is flowchart of the steps required to return a CONNECT message via a PNNI network for use with the method shown in FIG. 6A.

FIG. 6C is a flowchart detailing the steps required to return the CONNECT message to the calling party via PNNI network 100 of step 6400 of FIG. 6A. Once the reroutable connection has been successfully established in the direction of the called party, the network exit border node generates a CONNECT message (Step s6405). The CONNECT message confirms the connection path as being reroutable by including the REROUTING CAPABILITIES IE. In order to return the CONNECT message along the proper call connection path, a stack of RENDEZVOUS NODE INTERFACE (RNI) IEs is also included in the CONNECT message.

Preferably, the network exit border node is a border node for all the PGs in the PNNI network hierarchy and, therefore, is at the top of the DTL stack. The initial DTL stack contains one RNI per PG at each level of this hierarchy. Also, in the initial stack all the RNIs contain the same rendezvous node interface address. As the CONNECT message progresses toward the calling party, these addresses are updated as appropriate by the exit border nodes of the traversed PGs. After generation, the CONNECT message is transmitted from the network border exit node to the PG exit border node (Step s6410).

Upon receiving the CONNECT message containing the REROUTING CAPABILITIES IE (step s6415), the PG exit border node updates the RNI stack contained therein (Step s6420). Preferably, for each DTL removed from the DTL stack upon forwarding the SETUP message, the PG exit border node updates the RNI situated on a corresponding level in the RNI stack, or adds it to the RNI stack if an RNI for the level does not exist. For every DTL added to the DTL stack upon forwarding the SETUP message, the PG exit node adds the RNI having a corresponding level in the RNI stack, if such an RNI exists, and stores the information. The RNI level is specified by the rerouting level field specified in the IE.

The PG exit border node also sets the RNI address fields of the affected RNIs to the address of the PG exit node's reconnection interface and sets the SNs in the SN information fields to zero. Finally, the PG exit node removes any RNI from the stack whose level does not match a PG level in the node's ancestry line. This procedure cleans up the stack by eliminating those RNIs added by neighboring PG hierarchies configured with different levels. Preferably, the node supplies the RNI information on some level or it cannot become a rendezvous node for the level, and rerouting is not possible on any segment corresponding to the PG on that level.

Next, the CONNECT message is forwarded from the PG exit border node to the PG entry border node (Step s6425).

Upon receiving the CONNECT message, the PG entry border node processes the RNI stack (Step s6430). Preferably, for every DTL added to the DTL stack upon forwarding the SETUP message, the PG entry node removes the RNI having a corresponding level in the RNI stack, if such an RNI exists, and stores the information. The RNI level is specified in the rerouting level field in this IE. The PG entry node also removes any RNI from the stack whose level does not match a PG level in the node's ancestry line. This procedure cleans up the stack, eliminating those RNIs added by neighboring PG hierarchies that are configured with different levels. If the RNI on some level is missing, then the node cannot become a routing node on that level, and rerouting will not be possible on any segment corresponding to the PG on that level.

After processing the RNI stack and storing the address information, the PG entry border forwards the CONNECT message to the network entry border node (Step s6435). Upon receiving the CONNECT message (Step s6440), the network entry border node processes the RNI stack by removing and storing appropriate RNIs (Step s6445). After processing, the control flow returns to Step s6500 of FIG. 6A.

V. Detailed Rerouting Procedure

Figure 7A:
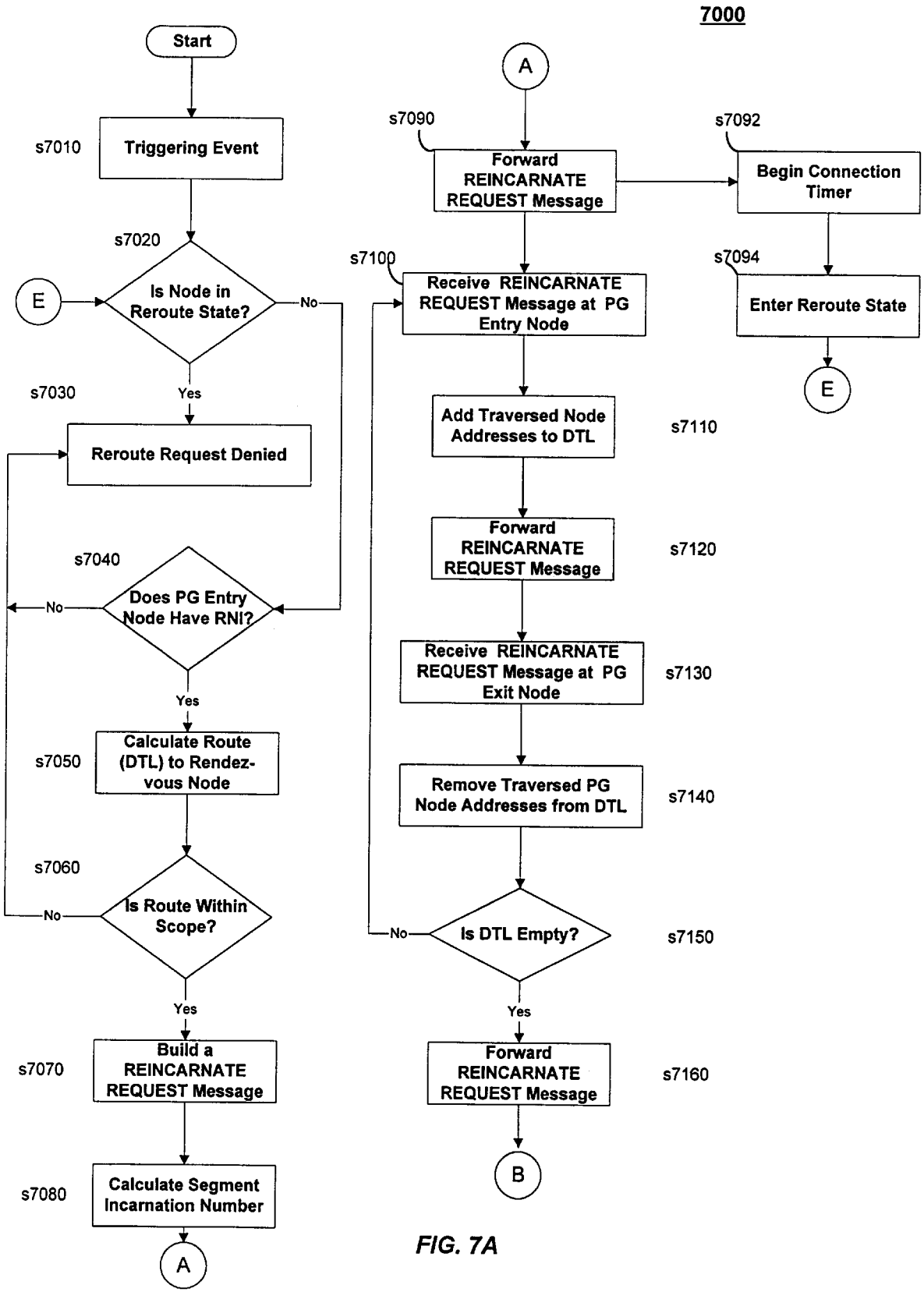
FIGS. 7A, 7B, and 7C are flowcharts of a rerouting protocol consistent with the present invention.
Figure 7B:
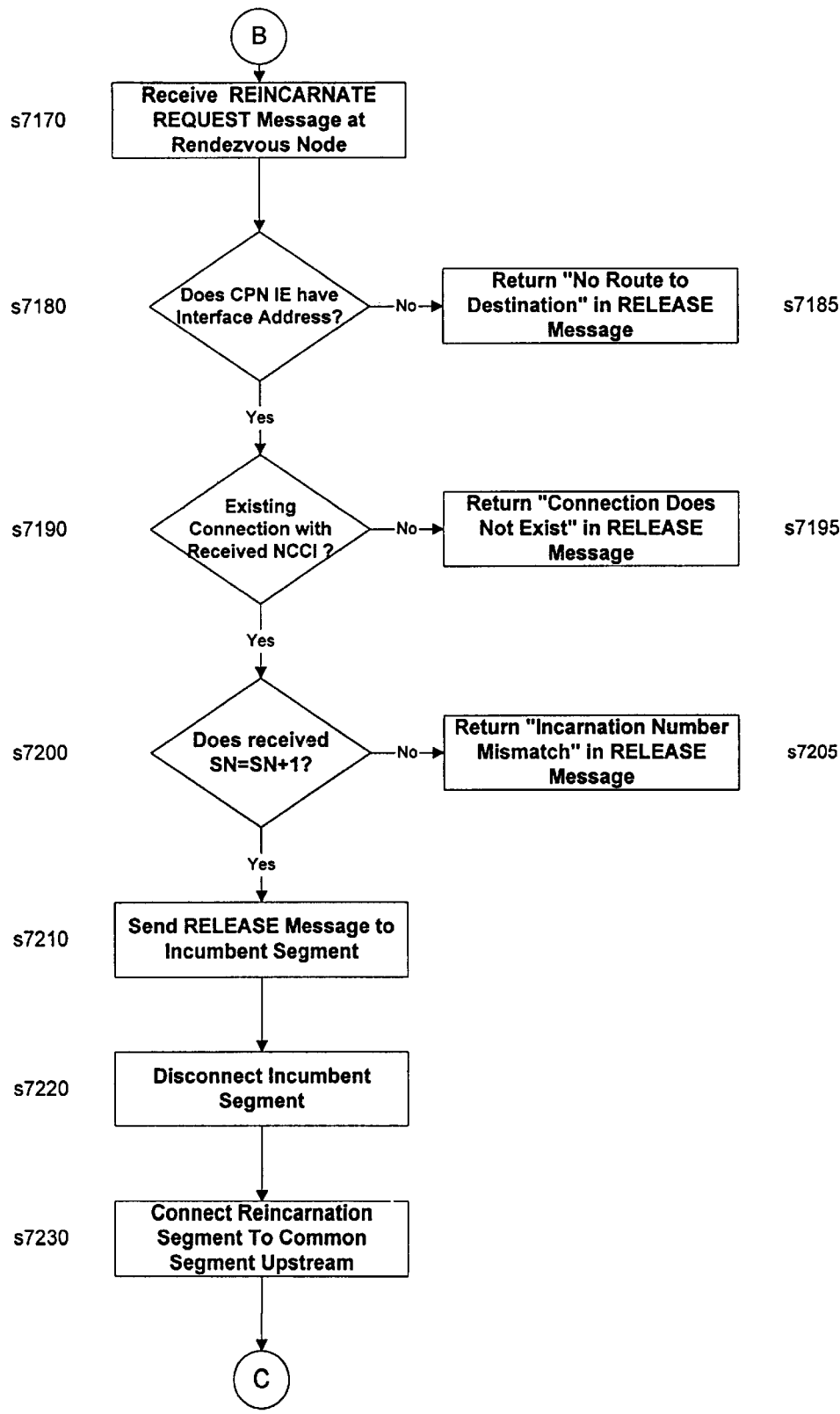
Figure 7C:
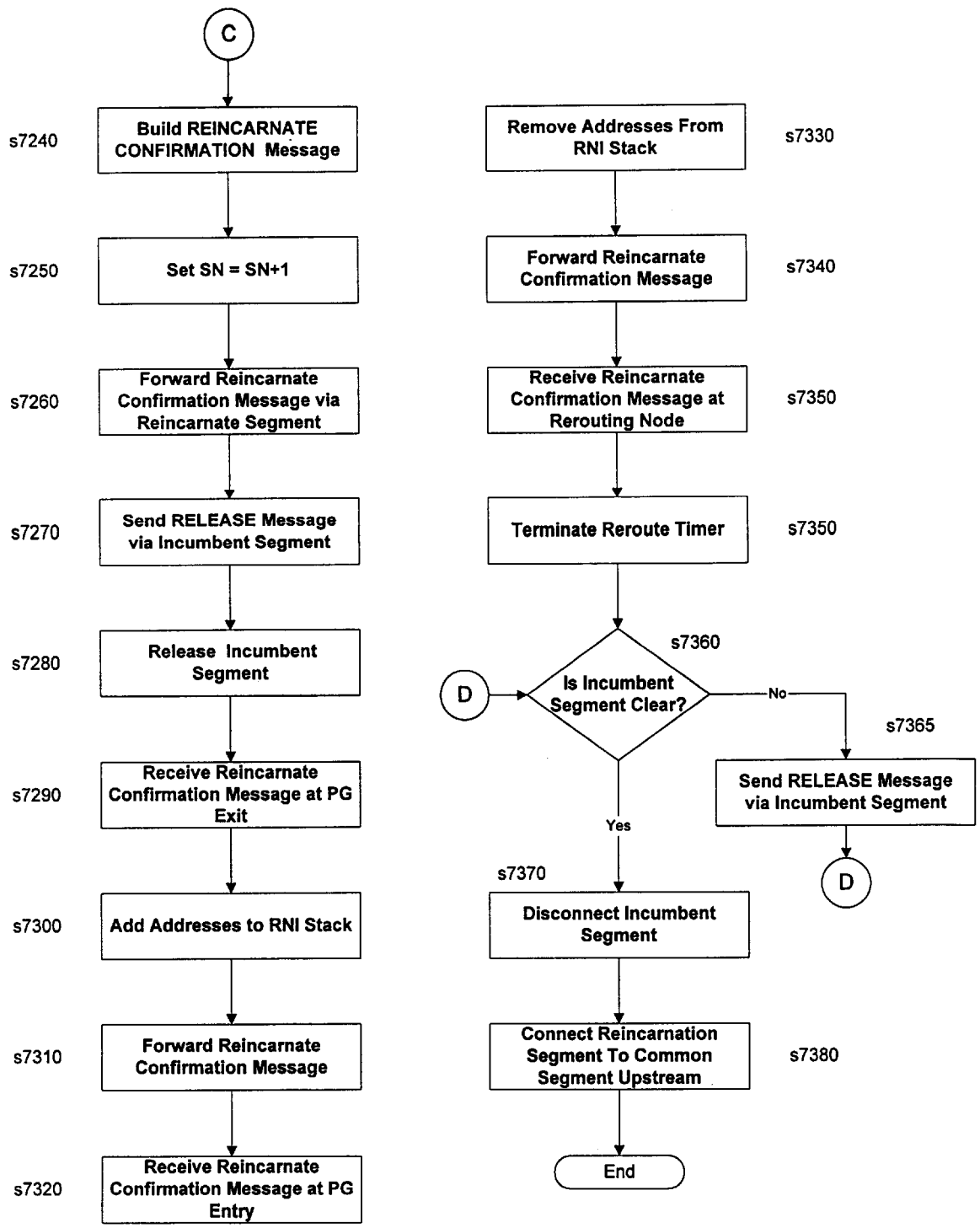

FIGS. 7A–7C are flowcharts of a rerouting protocol 7000 consistent with the present invention. FIGS. 7A–7C provide a more detailed description of the procedures described in conjunction with FIGS. 2–5A. The flowcharts only provide an exemplary and representative description of the rerouting protocol those skilled in the art will recognize that various procedures are performed concurrently and not strictly sequentially as depicted. Preferably, rerouting protocol 7000 is executed after a reroutable connection has been successfully established by method 6000. Additional SETUP, CONNECT, and RELEASE messages, intended to reroute the connection on a given segment, are included to distinguish the rerouting protocol from the regular call connection path establishment.

A SETUP message intended to reroute, or "reincarnate," the connection on another segment is called a "reincarnate request," and is distinguished from the initial SETUP message by the presence of the REINCARNATE IE. The initial SETUP message is also referred to as a regular setup. A CONNECT message sent and received in reply to the reincarnate request is called a "reincarnate confirmation message." A RELEASE message sent and received in reply to the reincarnate request is called a "reincarnate reject" message. A RELEASE message intended to reroute the connection is called the "reroute request," and is distinguished from the RELEASE message, a "regular release," i.e., intended to clear the connection by the presence of the REROUTE IE.

Rerouting protocol 7000 is supported even if some nodes, such as PNNI 1.0 nodes, along the call connection path do not support rerouting. These nodes process the messages as if they were regular SETUP, CONNECT or RELEASE commands. In the present preferred embodiment, at least the network entry and exit border nodes of the PNNI network support rerouting.

In the present preferred embodiment, the reincarnation procedure is initiated by the entry border node of some PG within the PNNI network. As a rule, such a node (switching system) is allowed to have only one reincarnation procedure in progress at any time, even if it is a border node for more than one PG in the hierarchy.

A reincarnate, or rerouting, procedure is triggered at a PG entry border node by an event that is associate with a rerouting reason, such as route optimization. Other events capable of triggering the procedure include rerouting reasons such as QoS adjustment, load balancing, priority call bumping, etc. The connection identity, the rerouting level (determining the rerouting segment), the rerouting reason and the conditions to be satisfied by the reincarnation route, are supplied as parameters for the generated event. After the trigger, the entry border node becomes the rerouting node for the current rerouting procedure.

A. REINCARNATE REQUEST

Referring now to FIG. 7A, upon receiving the rerouting event trigger for a reroutable connection (Step s7010), the rerouting node determines whether it is in a rerouting in progress state (Step s7020). If yes, then the rerouting request is denied (Step s7030) and the procedure ends (not shown). If not, the node determines whether an RNI from the rendezvous node on the requested rerouting level was previously received (Step s7040). If the RNI was not previously received, then the rerouting request is denied (Step s7030). If the RNI was previously received, then the node calculates a new route (a new DTL stack) to the rendezvous node (Step s7050). Next, the rerouting node determines whether the route to the rendezvous node is within the current rerouting scope and whether it can satisfy the conditions imposed by the triggering event (Step s7060). If no such route exists, then the rerouting request is denied (Step s7030) and the procedure ends (not shown).

If such a route does exist, the rerouting node builds a reincarnate request message containing the same parameters as the initial SETUP, including the REROUTING CAPABILITIES IE and the GENERIC IDENTIFIER TRANSPORT IE (specifying the NCCI) (Step s7070). The reincarnate request message differs from the regular SETUP message by the following: 1) the CALLED PARTY NUMBER IE contains the address of the reconnection interface at the rendezvous node, obtained from the RNI address field of the RNI that corresponds to current the rerouting level; and 2) the DTL stack contains the reincarnation route to the rendezvous node, such that the RNI will be the DTL terminator for the path. Preferably, the DTL stack contains only DTLs on levels lower or equal to the current rerouting level.

Within the reincarnate request message is a REINCARNATE IE, which includes a current rerouting type (segment-based rerouting), the current rerouting reason (from the triggering event), and the current rerouting level. Further, the rerouting node calculates the SN and includes it in the REINCARNATE IE (step s7080). Preferably, to obtain this information, the node increments, by one, the incarnation number received in the RNI corresponding to the current rerouting level.

The node then forwards the reincarnate request message toward the rendezvous node (Step s7090), starts a rerouting timer associated with this connection (Step s7092), and enters the Rerouting In Progress state (Step s7094). If the rerouting timer associated with a connection expires at the rerouting node, and the current rerouting scope is the highest-level PG, then the node clears the connection in the direction of the calling party by progressing a regular RELEASE message with termination cause "Rerouting timer expired." If the current rerouting scope is not the highest-level PG, then the node extends the rerouting scope by proceeding fuirther up the RNI stack.

Upon receiving the reincarnate request message (Step s7100), a PG entry border node initializes its rerouting-related data structures. Particularly, the PG entry node must determine the levels and the node addresses, within its PG hierarchy, that it pushed onto the DTL stack during the routing process for this call connection. The PG entry border node adds these addresses to the DTL stack (Step s7 110). Next, the PG entry border node forwards the reincarnate message to the PG exit border node (Step s7120).

Upon receiving the reincarnate request message (Step s7130), a PG exit border node initializes its rerouting-related data structures. Particularly, the node must determine the levels of all the DTLs removed from the DTL stack during the routing process for the call. The removal process logs the address of internal PG nodes traversed by rerouted path between the reroute node and the rendezvous node (Step s7140).

Next, it is determined whether the DTL stack is empty (Step s7150). If the DTL is empty, the node is a rendezvous node for the rerouted connection. If the DTL stack is not empty, control flow returns to Step s7100. The DTL still contains node addresses when there is more than one PG traversed by the call connection path. Preferably, any number of intermediate PGs can reside between the rerouting node and the rendezvous node. As such, the call connection path and subsequent messages transmitted will traverse these intermediate PGs. If the DTL is empty, the node forwards the SETUP message toward the rendezvous node (Step s7160).

B. REINCARNATE CONFIRMATION

Referring now to FIG. 7B, when the reincarnate request message is received (Step s7170), the rendezvous node determines whether the CALL PARTY NUMBER (CPN) IE includes a reconnection interface address for this node (Step s7180). The reconnection interface is an interface traversed by a connection at the rendezvous node and situated on the side of the called party. The address of this interface is used by the rerouting node in its reincarnation request to calculate the route to the rendezvous node. If no address is present, the reincarnate request is rejected by sending a regular RELEASE message toward the rerouting node with a "No Route to Destination" cause (describing the reason for termination) in the IE (Step s7185). This event occurs if the exit border node does not support rerouting and consequently did not update the appropriate RNI that were passed along unmodified from a previous border node. If such an event occurs, the rendezvous node behaves as any node (and not necessarily supporting rerouting, thereby enabling an entry border node supporting rerouting to detect a corresponding exit border node not support rerouting.

Next, the rendezvous node determines whether there is an existing connection with the same NCCI as the one received (Step s7190). If there is no existing connection, then the reincarnate request is rejected and a regular RELEASE message with a "Connection Does Not Exist" cause in the CAUSE VALUE CALL TERMINATION IE is sent toward rerouting node (Step s7195). Otherwise, the node compares the current SN information received in the REINCARNATE IE with the SN information in effect for the existing connection on the same rerouting level (i.e., the number this node has sent along in the latest RNI for that level) (Step s7200). Preferably, the received SN equals one greater then the SN currently in effect and unsigned arithmetic integers are used, allowing incarnation numbers to wrap and go back to zero. If received SN does not equal SN+1, the reincarnate request message is rejected and a regular RELEASE message with a "Incarnation Number Mismatch" cause in the CAUSE VALUE CALL TERMINATION IE is returned toward the rerouting node (Step s7205).

If the received SN is correct, the rendezvous node accepts the reincarnate request and transmits a RELEASE message to the upstream node (relative to the call direction), i.e, the neighboring node from which it received the reincarnate request (Step s7210). The RELEASE message disconnects the incumbent segment, (i.e., the rerouting segment of a connection during the execution of a rerouting procedure) from a common segment downstream (Step s7220), i.e., the segment of the connection between the rendezvous node and the network border node adjacent to the called party. Preferably, the common segment downstream is unaffected by the reincarnate procedure. Next, the node connects a reincarnation segment (i.e., the segment of the connection set-up along another route and intended to replace the rerouting segment of the connection) to the common segment downstream (Step s7230).

Referring now to FIG. 7C, once the reconnection procedure to the common segment downstream is complete, the node builds a reincarnate confirmation message (Step s7240). The reincarnate confirmation message is generated in a similar manner as the regular CONNECT message describe above (see Step s6205), however, there is one RNI in the stack for each PG in the rendezvous nodal hierarchy. The RNIs stack from the lowest level up to the current rerouting level. Further, the node sets the SNs in the SN information field of these RNIs to their previous values incremented by one, SN+1 (Step s7250). This step confirms the new SN information for the current rerouting segment, and all the possible rerouting segments within any lower-level PGs, to the corresponding PG entry border nodes. Also, the rendezvous node establishes the new SN information as the current numbers in effect for these segments.

After determining the new SN information, the rendezvous node returns the reincarnate confirmation message in the direction of the rerouting node via the reincarnation segment (Step s7260). If the rendezvous node is in an Active state (i.e., the incumbent segment has not been cleared yet), it sends a regular RELEASE message toward the rerouting node via the incumbent segment (Step s7270), terminating the connection to the incumbent segment (Step s7280). To distinguish this RELEASE message from a RELEASE message intended to clear the whole connection and arriving at the rerouting node before the reincarnate confirmation message, this RELEASE message contains a special termination cause, "Segment Invalidated," in the CAUSE VALUE CALL TERMINATION IE.

If the node is not in the Active state, but a Rerouting In Progress state (i.e., the incumbent segment has already been cleared), then it changes to the Active state. In addition, if the rendezvous node is a network exit border node for the connection, then it transmits a STATUS message toward the called party.

Upon receiving the reincarnate confirmation message (Step s7290), the PG exit border node updates the RNI stack contained therein (Step s7300). In particular, the PG exit node determines the RNIs to be added to the RNI stack corresponding to the levels of the DTLs removed from the DTL stack when the reincarnate request message was forwarded. Further, if another connection with the same NCCI exists at this interface, the PG exit node sets the SN in the SN information field of the affected RNIs to SN+1. This procedure confirms the new SNs (for the segments determined by all the PGs in which this node is an exit border node) to the corresponding entry border nodes. In addition, the node establishes the new SN information as the current SN information in effect for these segments. Next, the PG exit border node forwards the reincarnate confirmation message to the PG entry border node (Step s7310).

Upon receiving the reincarnate confirmation message (Step s7320), the PG entry border node processes the updated RNI stack contained therein (Step s7330). Preferably, the PG entry border node determines the levels of all the RNIs to be removed (and saved) from the RNI stack. The removed RNIs correspond to the levels of the DTLs removed from the DTL stack when the reincarnate request message was forwarded. The removal process logs the addresses of internal PG nodes traversed by rerouted path between the reroute node and the rendezvous node of the traversed PG. Next, the PG entry border node forwards the reincarnate confirmation message toward the rerouting node (Step s7340).

When the reincarnate request confirmation is received at the rerouting node, it stops the rerouting timer associated with the connection (Step s7350) and saves the information in the RNIs. Next, the rerouting node determines whether the incumbent segment was cleared (Step s7360). If so, the node disconnects the incumbent segment from the common segment upstream (Step s7370) and connects the reincarnation segment to the common segment upstream (Step s7380), ending the rerouting procedure.

Otherwise, the node forwards a regular RELEASE message with the termination cause, "Segment Invalidated," toward the rendezvous node via the incumbent segment (Step s7365). Preferably, if the node is also the network entry border node for the connection, then it progresses a STATUS message in the direction of the calling party.

VI. Conclusion

The present invention provides a protocol and mechanism for rerouting ATM connections within PNNI environments. Systems and methods consistent with the present invention provide a consistent set of rules to interface with PNNI 1.0.

It will be appreciated by those skilled in this art that various modifications and variations can be made to the rerouting signaling protocol consistent with the present invention described herein without departing from the scope or spirit of the invention. For example, consistent with the present invention, the rerouting protocol could be implemented for preemptive routing conditions as described above. Further, certain IE field values would change to properly reflect fault based rerouting, or preemptive rerouting. In addition, release and connection order of certain nodes could be altered. Finally, while the present invention is described in a PNNI environment, systems and methods consistent with the present invention could operate in any hierarchical communication environment where call path rerouting is necessary or desired. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

What is claimed:

1. In a network having at least one peer group including a plurality of nodes, a method for managing calls between a set of nodes, the method comprising:

establishing a reroutable call path connecting a source node to a destination node, the reroutable call path traversing the set of nodes;

detecting an event associated with the reroutable call path;

generating a reincarnate request upon an occurrence of the event by inserting a rendezvous node address in a called party identifier IE associated with the reincarnate request, wherein the reincarnate request includes a rerouting type;

determining a new call path connecting a new set of nodes in a peer group, wherein the peer group includes at least one level, wherein the level includes a set of border nodes defining a peer group segment path;

calculating a route to a rendezvous node via the peer group segment path, wherein the rendezvous node is a peer group exit border node;

inserting, into the reincarnate request, an address stack specifying a nodal address and a level number for each node in the route to the rendezvous node, wherein the level number identifies the level on which the node resides;

transmitting the reincarnate request from a rerouting node in the peer group to the rendezvous node via the route, wherein the rerouting node is a peer group entry border node; and establishing the new call path connecting the new set of nodes, wherein the source node and the destination node remain connected.

2. The method of claim 1, wherein the step of establishing the new call path includes the substeps of returning a reincarnate confirmation message upon receipt of the reincarnate request; and connecting the rerouting node to the rendezvous node via the new set of nodes upon receipt of the reincarnate confirmation message.

3. The method of claim 2, wherein the substep of returning the reincarnate confirmation message includes the substeps of generating the reincarnate confirmation message; and transmitting the reincarnate confirmation message to the rerouting node.

4. The method of claim 3, wherein the reincarnate confirmation message traverses more than one peer group level, wherein each exit border node is identified by a rendezvous node interface (RNI), and wherein the substep of generating the reincarnate confirmation message includes the substep of including a stack of RNIs in the reincarnate confirmation message, and wherein the substep of transmitting the reincarnate confirmation message includes the substep of processing the RNI stack for the exit border node traversed by the reincarnate confirmation message.

5. The method of claim 4, wherein the reincarnate request includes an incarnation number identifying a particular rerouting request, and wherein substep of generating the reincarnate confirmation message further includes the substeps of identifying the call path based on a call path identifier received in the reincarnate request; and using the received incarnation number to determine whether the particular rerouting is an out of sequence rerouting request.

6. The method of claim 5, wherein the reincarnate confirmation message includes a metric preservation field, and wherein the step of transmitting includes the substep of distributing a metric value in the metric preservation field to all of the peer groups traversed by the reincarnate confirmation message.

7. The method of claim 6, wherein the substep of transmitting the reincarnate request from the rerouting node in the peer group to the rendezvous node includes the step of transmitting, if the reincarnate message is not returned from the rendezvous node, the reincarnate request from the rerouting node to a second exit border node, wherein the second border node resides on a peer group level higher then the rendezvous node.

8. In a communication network having peer groups comprised of nodes, a method for establishing a reroutable call connection comprising the steps of receiving a call request at a source node;

forwarding a setup message to a destination node, the setup message including a rerouting information element (IE) identifying the call request as a reroutable call request, wherein the rerouting IE specifies a peer group based rerouting type;

generating a designated transit list (DTL) identifying nodes traversed by the reroutable call connection path;

conveying the setup message from the network entry node to a network exit node residing downstream from the network entry node, wherein the reroutable call connection path is identified by a call identifier, wherein each peer group includes at least one level with a set of nodes, wherein each node is identified by a nodal address including a scope number indicating the at least one level on which the node resides;

inserting the call identifier into the setup message;

transmitting the setup message via a reincarnation segment path having the same call identifier as the reroutable call connection path;

adding the nodal address for each node traversed by the reincarnate segment path to the DTL;

returning, upon receiving the setup message, a connect message to the source node; and connecting the source node to the destination node via the reroutable call connection path.

9. The method of claim 8, and wherein the step of forwarding the setup message includes the substeps of transmitting the setup message to a network entry node;

sending the setup message to the destination node upon receiving the setup message.

10. The method of claim 4, wherein the network entry node is a peer group border node, and wherein the step of transmitting the setup message at the network entry node includes the substep of receiving the setup message at the peer group border node.

11. The method of claim 10, wherein the reincarnation segment path traverses more than one peer group, and wherein the method further comprises the step of repeating the conveying and adding steps for each peer group traversed by the reincarnation segment path.

12. The method of claim 11, wherein the network exit node is a second peer group border node, and wherein the step of receiving the setup message at the network exit node includes the substep of receiving the setup message at the second peer group border node via the reincarnation segment path.

13. The method of claim 12, wherein the step of sending the setup message to the destination includes the substep of removing the nodal address from the DTL for each node traversed by the reincarnation segment path.

14. The method of claim 13, wherein the DTL includes an rendezvous node interface (RNI) for identifying a rendezvous node in the reroutable call connection path, wherein the step of returning includes the substeps of generating the connect message;

forwarding the connect message from the network exit node to the network entry node;

receiving the connect message at the network entry node; and sending the connect message to the source node.

15. The method of claim 13, wherein the step of generating includes the substeps of inserting an RNI stack into the rerouting capabilities information element, wherein the RNI stack includes the RNI for each rendezvous node traversed by the connect message; and adding the rerouting IE received in the setup message to the connect message.

16. The method of claim 14, wherein the network exit node is a peer group border node, and wherein the step of receiving the connect message at the network exit node includes the substep of receiving the connect message at the peer group border node.

17. The method of claim 16, wherein each peer group includes at least one level, wherein the RNI identifies the nodal address and the scope number of the rendezvous node, and wherein the step of conveying includes the substeps of forwarding the connect message via the reroutable call connection path; and adding the RNI to the RNI stack for each rendezvous node traversed by the reroutable call connection path.

18. The method of claim 17, wherein the reroutable call connection path traverses more than one peer group, and wherein the method further comprises the step of repeating the forwarding and adding steps for each peer group traversed by the reroutable call connection path.

19. The method of claim 18, wherein the network entry node is a second peer group border node, and wherein the step of receiving the connect message at the network entry node includes the substep of receiving the connect message at the second peer group border node via the reroutable call connection path.

20. The method of claim 19, wherein the step of sending the connect message to the source node includes the substep of removing the nodal address and the scope number from the RNI stack for each rendezvous node traversed by reroutable call connection path.

21. The method of claim 20, wherein the rerouting IE specifies a rerouting level number identifying the at least one peer group level delimited by the peer group entry node and peer group entry exit node.

* * * * *

UNITED STATES PATENT AND TRADEMARK OFFICE
CERTIFICATE OF CORRECTION

PATENT NO. : 6,111,881
DATED : August 29, 2000
INVENTOR(S) : Soncodi

It is certified that error appears in the above-identified patent and that said Letters Patent is hereby corrected as shown below:

Claims,

Claim 10, column 19,
Line 37, "claim 4" should read -- claim 9 --.

Signed and Sealed this

Second Day of October, 2001

*Attest:*

*Attesting Officer*

NICHOLAS P. GODICI
*Acting Director of the United States Patent and Trademark Office*